United States Patent
Jones et al.

(10) Patent No.: US 8,756,243 B2
(45) Date of Patent: Jun. 17, 2014

(54) NON-PROGRAMMATIC ACCESS TO ENTERPRISE MESSAGING ADMINISTRATION

(75) Inventors: Gareth E. Jones, Winchester (GB); Saket Rungta, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/363,423

(22) Filed: Feb. 1, 2012

(65) Prior Publication Data

US 2012/0130951 A1 May 24, 2012

Related U.S. Application Data

(63) Continuation of application No. 12/365,312, filed on Feb. 4, 2009, now Pat. No. 8,190,558.

(30) Foreign Application Priority Data

Mar. 4, 2008 (EP) .................................... 08152259

(51) Int. Cl.
*G06F 17/30* (2006.01)

(52) U.S. Cl.
USPC ........................................................ 707/758

(58) Field of Classification Search
USPC .................. 707/2, 3, 714, 758; 709/204–206
See application file for complete search history.

(56) References Cited

U.S. PATENT DOCUMENTS

| | | | |
|---|---|---|---|
| 7,958,101 B1 | 6/2011 | Teugels et al. | |
| 2003/0233397 A1 | 12/2003 | Katz et al. | |
| 2005/0038771 A1 | 2/2005 | Sugihara et al. | |
| 2006/0123413 A1 * | 6/2006 | Collet et al. | 717/174 |

\* cited by examiner

*Primary Examiner* — Etienne Leroux
(74) *Attorney, Agent, or Firm* — Cuenot, Forsythe & Kim, LLC

(57) ABSTRACT

The present invention is directed to non-programmatic access to enterprise messaging administration. A method of operating a data processing system, wherein the data processing system includes a file system, a messaging system and a monitoring component, in accordance with an embodiment includes: monitoring the file system, detecting a change in the file system, and amending a structure of the messaging system, according to the detected change in the file system.

15 Claims, 6 Drawing Sheets

NON-PROGRAMMATIC ACCESS TO ENTERPRISE MESSAGING ADMINISTRATION

CROSS-REFERENCE TO RELATED APPLICATIONS

This application is a Continuation of U.S. application Ser. No. 12/365,312, filed on Feb. 4, 2009, which application claims the benefit of European Patent Application Number EP 08152259.1, filed on Mar. 4, 2008, both of which are incorporated herein by reference in their entirety.

FIELD OF THE INVENTION

The present invention relates to a method of operating a data processing system, the data processing system itself, and a computer program product for operating a component in the data processing system. In one embodiment, the invention provides non-programmatic access to enterprise messaging administration.

RELATED ART

Messaging systems have evolved to the point that they can provide excellent message delivery reliability and performance while shielding application program developers and users from the complexity of route determination, message delivery, and format transformations that are required when transferring a message across a distributed heterogeneous data processing network. Typical enterprise messaging products allow application programs to access the messaging functions via a feature-rich Application Programming Interface (API). Such APIs can give application program developers, and potentially users of the application programs, a great deal of control over their messaging (e.g., defining persistence and priority attributes) without requiring each application developer to write a lot of complex code. Instead, application program developers can focus their attention on writing program code to implement desired application-specific and business-specific tasks, while relying on common functions provided by the messaging middleware.

Commercially-available messaging systems include, for example, the WebSphere MQ family of messaging middleware products from IBM Corporation (WebSphere and IBM are registered trademarks of International Business Machines Corporation in the United States, other countries, or both), which use asynchronous messaging via queues (intermediate storage locations that avoid the need for sender and receiver applications to be active and accessible at the same time). A sender application program issues a 'Put Message' command (an API call) to send a message to a target queue, and the WebSphere MQ messaging middleware programs handle the complexities of transferring the message under transactional control from the sender to the target queue, which may be remotely located across a heterogeneous computer network. Having 'Put' the message, the sender application program can continue with other processing as it is not required to participate any further in the message communication. The messaging systems (the middleware programs) implement transactional assured message delivery even when the destination application is not available at the time the message was sent (unlike the conversational, synchronous Remote Procedure Call communication model). The target queue is an input queue for another application program, which retrieves the message from this input queue by issuing a 'Get Message' command (another API call) asynchronously from the send operation. The receiver application program then performs its processing on the message, and may generate further messages.

Although messaging middleware with a well-designed API is a huge help to application program developers, greatly reducing the complexity (and therefore the development time) of many application programs, there is still a need for considerable domain-specific knowledge and skills before these traditional APIs can be used. A novice application program developer may have to invest a lot of time learning the details of an API before they can develop application programs that exploit the capabilities of the messaging system.

SUMMARY OF THE INVENTION

According to a first aspect of the present invention, there is provided a method of operating a data processing system, the data processing system comprising a file system, a messaging system, and a monitoring component, the method comprising: monitoring the file system, detecting a change in the file system, and amending a structure of the messaging system, according to the detected change in the file system.

The structure of the messaging system may include, for example, an associated object of the messaging system, a property of an object in the messaging system, etc.

According to a second aspect of the present invention, there is provided a data processing system comprising a file system, a messaging system, and a monitoring component, wherein the monitoring component is arranged to monitor the file system, to detect a change in the file system, and to amend a structure of the messaging system, according to the detected change in the file system.

According to a third aspect of the present invention, there is provided a computer program product on a computer readable medium for operating a monitoring component, the monitoring component forming part of a data processing system also including a file system and a messaging system, the product comprising instructions for monitoring the file system, detecting a change in the file system, and amending a structure of the messaging system, according to the detected change in the file system.

Owing to the invention, it is possible to provide a method and system for making structural changes to a messaging system without the need to be familiar with the administration of the messaging system, indeed without even needing to have any access or direct contact with the messaging system. A user, with a relatively low level of technical knowledge, can make changes in a file system, for example through a simple and conventional graphical user interface. These changes are detected by the monitoring component within the system, and the monitoring component mirrors the changes in the file system that have been made, in the messaging system. While a relatively small number of people have sufficient technical skills and knowledge to make administrative changes to a messaging system, a much larger number of people are familiar with the working of a file system, which uses the familiar concepts of directories, sub-directories and files within these components.

The present invention allows administration actions to be performed on a messaging system using non-programmatic access. Messaging systems have associated administrative objects (for example, queue managers, queues, topics, etc.). In the prior art, the way in which administrative actions are executed on these objects (e.g., using a protocol, or using a particular GUI, etc.) is dependent on the particular type of message engine. The invention allows disparate messaging engine APIs to be accessed via a common API associated with a file-oriented application program. It allows a user to execute administrative actions on administrative objects using the file-oriented application program API whilst benefiting from the capabilities of message-oriented middleware.

For example, administrative objects of a messaging engine are represented in the file-oriented application program (for example, queues can be represented as sub-directories). The data processing system handles administrative actions executed on the represented administrative objects. For example, in order to create an administrative object (for example a queue), a user executes an action of creating a sub-directory in a file system. The monitoring component detects the new sub-directory and captures the action. The action is mapped to a particular corresponding action (for example by using a programmable command format (PCF) message or a custom protocol) associated with a particular messaging engine and the change embodied by the action in the file system is propagated to the particular messaging engine. Thus, the action of creating a sub-directory is mapped to an action of creating a queue.

Advantageously, the method further comprises monitoring the messaging system, detecting a change in the messaging system, and amending the structure of the file system, according to the detected change in the messaging system. In this way, it should be understood that the data processing system can map administrative actions executed on an administrative object such as a queue and propagate the action to the file-oriented application program, thereby providing a two-way mirror of the changes in the messaging system to the file system.

The detected change in the file system may comprise, for example, the creation or deletion of a directory, and the amending of the structure of the messaging system may comprise, for example, the corresponding creation or deletion of a queue manager, queue, topic, or other object in the messaging system. In this case, as mentioned above, the nature of the object created in the messaging system is determined by the relative position in the hierarchy of the file system of the detected created directory. This provides a conceptually efficient and intuitive method for a relatively non-technical user to make administrative changes, and to control the effect of the changes in a readily-apparent manner. The hierarchy within the messaging system is mirrored in the hierarchy of the file system.

The detected change in the file system may comprise, for example, the creation, amendment or deletion of a file, and the amending of the structure of the messaging system may comprise, for example, the corresponding creation or deletion of one or more objects in the messaging system or the amendment of the properties of one or more objects in the messaging system. The non-technical user can also use the file component within the file system to create or delete objects in the messaging system and/or to control properties within the components of the messaging system, following a logical mapping that the user can easily understand. For example, a file within a directory can be used to define properties of the contents of the directory, or of the directory itself.

BRIEF DESCRIPTION OF THE DRAWINGS

Embodiments of the present invention will now be described, by way of example only, with reference to the accompanying drawings.

FIGS. 4b, 5b and 6b are schematic diagrams of a messaging system corresponding to the respective file systems shown in FIGS. 4a to 6a.

DETAILED DESCRIPTION OF THE INVENTION

Figure 1:
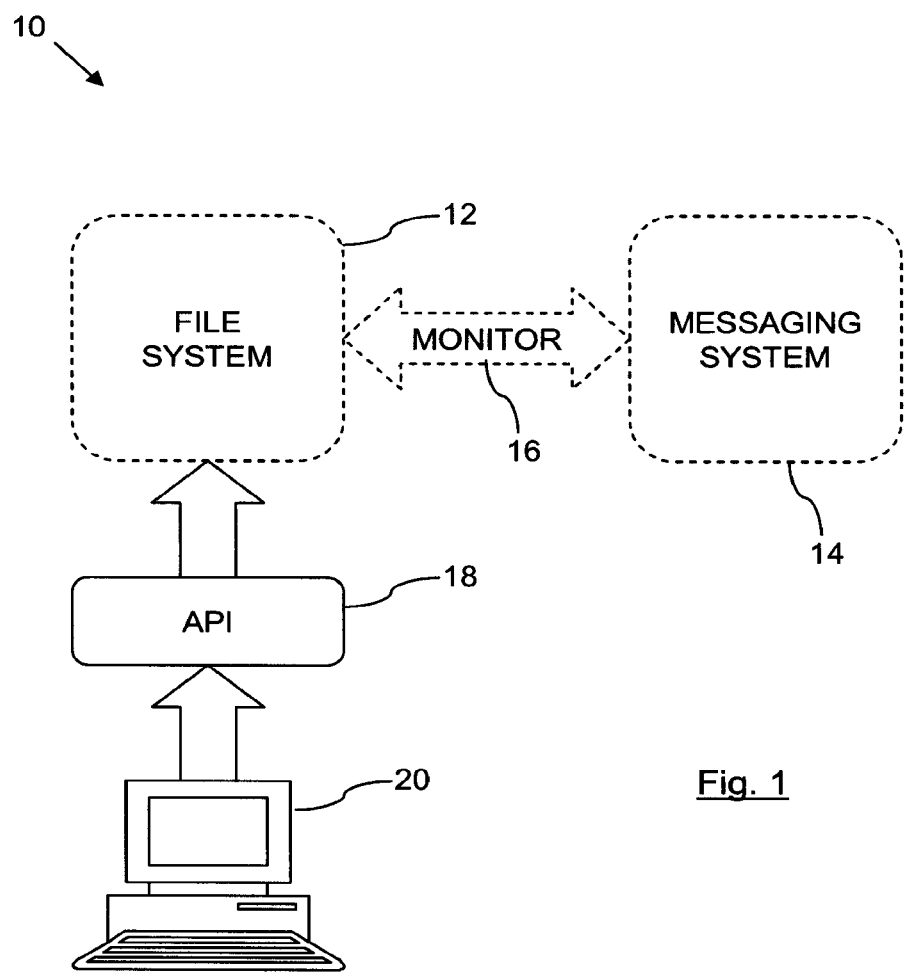
FIG. 1 is a schematic diagram of a data processing system.

A data processing system 10 according to an embodiment of the invention is shown in FIG. 1. The data processing system 10 comprises a file system 12, a messaging system 14, and a monitoring component 16. The monitoring component 16 is arranged to monitor the file system 12, to detect any change in the file system 12, and to amend the structure of the messaging system 14, according to the detected change in the file system. The monitoring component 16 is also arranged to monitor the messaging system 14, to detect a change in the messaging system 14, and to amend the structure of the file system 12, according to the detected change in the messaging system 14.

The monitoring component 16 allows a user who is relatively non-technical to make administrative changes to the messaging system 14. The user has access to the file system 12 through a suitable API 18, which, in this embodiment, is accessed via a suitable graphical user interface supported by a computer (client machine) 20. Other methods of accessing the API 18 are also possible. The configuration of the system 10 introduces non-programmatic access to enterprise messaging through a file system interface. This system 10 provides an approach which allows the user to perform administration of messaging engines and other components within the messaging system 14.

By simply interacting with the file system 12, the API 18 on the client machine 20 can perform administrative actions on one or more messaging objects within the messaging system 14. This allows the application programmer to have no knowledge of a complex administration API and allows administration of multiple messaging engines in a common manner. The following actions are examples of administrative functions that can be performed, for example create/delete/rename a directory in the file system 12 leads to the corresponding create/delete/rename of a queue manager/destination/other object within the messaging system 14. Similarly, create/delete/modify the contents of a special file within a directory in the file system 12 can lead to a corresponding modification of properties of a queue manager/destination/other object within the messaging system 14.

An "expression of intent" functionality can be provided in the system 10 which can also be used to perform administrative actions on multiple objects at once in a similar manner. Any administrative changes to the messaging system 14 from other sources can also be replicated back to the file system 12. The monitoring agent 16 listens to changes on the file system 12 and performs the appropriate administrative action on the appropriate messaging object(s) within the messaging system 14. Note that the monitoring agent 16 may interact with multiple different types of messaging engines and hence hides the different administration APIs from the API 18. For example, administration of a messaging engine within the messaging system 14 might be via PCF messages and administration of another messaging engine might be via a custom protocol over a socket. The user is unaware of the mechanisms that perform the changes that they have initiated by their changes to the file system 12 through the API 18.

Figure 2:
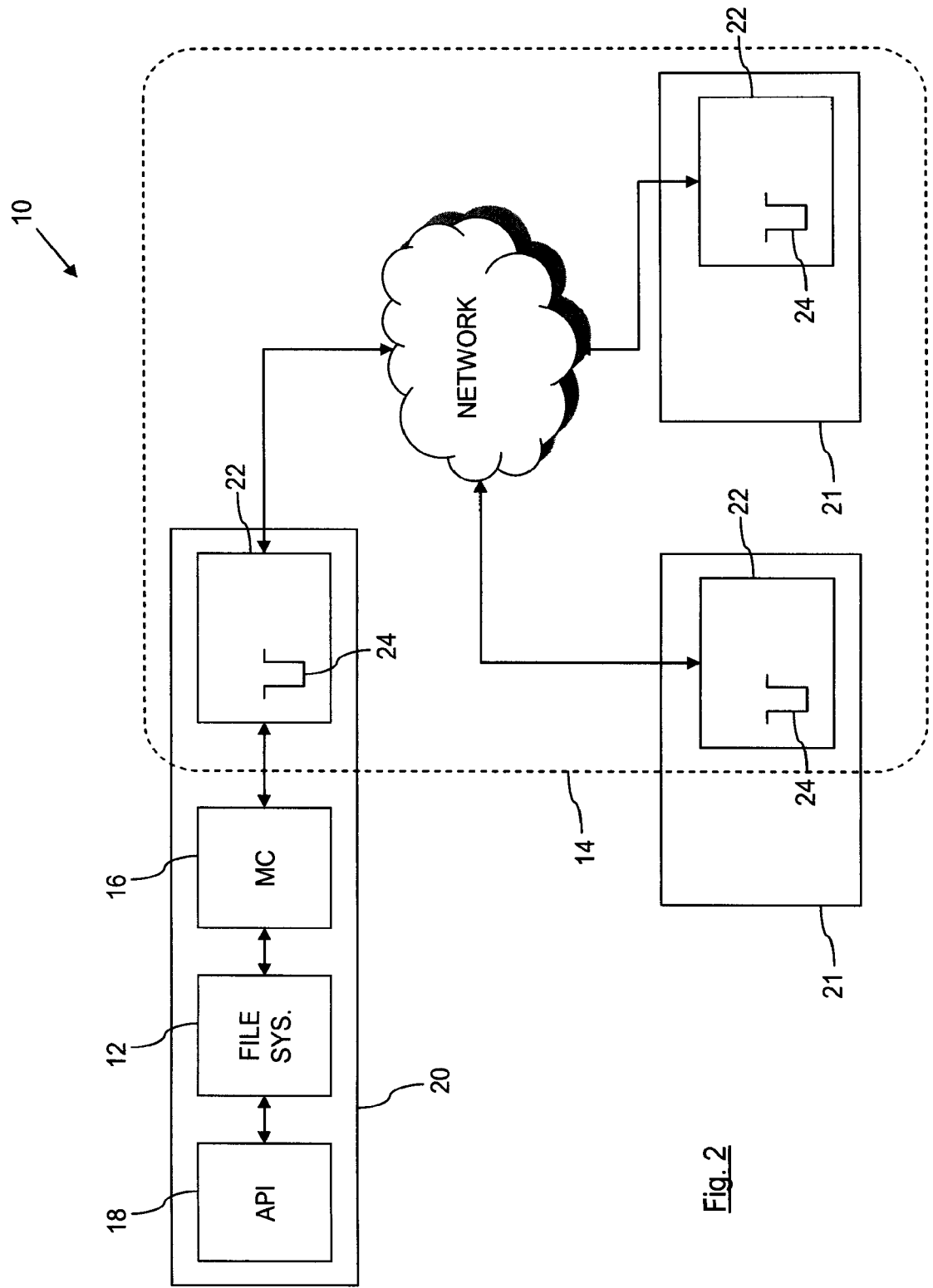
FIG. 2 is a schematic diagram, showing more detail of the data processing system of FIG. 1.

FIG. 2 shows part of a data processing network in which the present invention can be implemented. As is known in the art, the messaging system 14 may comprise homogeneous or heterogeneous collections of data processing apparatuses 20 and 21, potentially each running different operating systems and one or more application programs. Each data processing apparatus 20 and 21 typically runs a queue manager 22, with queues 24, which is capable of performing both sender and receiver functions within the messaging system 14. Some messaging systems include highly scalable and high-availability messaging manager servers running at some network nodes, with other nodes running small footprint client messaging programs that require the services of a messaging manager server running on a neighboring node of the network. Increasingly, as storage capacity and processing power becomes cheaper and more widely available, messaging functions may be implemented on any data processing device such as a mobile telephone, PDA, laptop or desktop computer as well as mainframe computers. The present invention is not limited to any specific types of data processing apparatus or messaging network topology.

In a messaging system, there may be many different application programs that each interface with a particular one of a potentially large number of queue managers, so the decision to show only three systems 20 and 21 in FIG. 2 is for simplicity and for illustrative purposes only. The term 'application program' as used herein is not limited to any particular programming language or model, and is intended to encompass message-consuming entities such as, for example, message driven beans (MDBs) or applications written in Java (Java and all Java-based trademarks are trademarks of Sun Microsystems, Inc. in the United States, other countries, or both) or in a C-based language.

In an embodiment, the queue managers 22 are conventional message-oriented middleware (MOM) products such as the WebSphere MQ messaging manager products from IBM Corporation. Such products shield application programs from a great deal of the complexity inherent in network communications, by implementing functions within the messaging manager products for route determination and transactionally-assured message delivery across a heterogeneous network for both persistent and non-persistent messages, and by providing one or more APIs that enable application programs to invoke the messaging functions via API calls. Despite the great advantages of reliability and application programming efficiency that such products provide, developing programs that implement an API nevertheless requires considerable domain-specific knowledge that novice programmers may not have. Furthermore, there are a great many existing application programs that were written without messaging middleware in mind, and it can be difficult to justify the work involved in rewriting them to implement an API even when they can benefit significantly from use of messaging middleware.

The present invention avoids the need to learn the complexity of the messaging middleware product's APIs, and avoids the need to rewrite existing file-oriented application programs to support messaging. Furthermore, the invention can provide support to file-oriented application programs written in any one of a number of different programming languages.

The present invention works with files within an operating system's file system 12. The files are each named (or otherwise identifiable) entities that can contain data and which are available to the data processing system's operating system. The structure of a file, the type of information represented by a particular sequence of binary digits within a file, and other characteristics such as data size limits, may vary between files and file types.

The file system 12 comprises an organized set of files and a set of methods for organized storing, accessing, and manipulating the files. The file system 12 may have an associated data storage device which stores the physical files, or a file system may be 'virtual' and comprise a logical organization of files that are distributed across multiple storage devices. As is known in the art, typical file-oriented programs implement the following operations (although this varies for different operating systems and file systems):

Create a directory or sub-directory;
Create a file;
Set attributes that control operations on the file;
Open a file to work with the file contents;
Read the file contents;
Update the file contents; and
Close the file.

The computer 20 provides a file-oriented API 18 with access to functions using conventional file system operations such as these. As shown in FIGS. 1 and 2, the API 18 initiates processing, for example, by creating a file within a file system directory on the local data processing apparatus 20. The API 18 is configured to store the created files under a given name within a specific named directory within local data storage (for example within persistent disk storage of the computer 20). The directory can be associated with a configuration file that defines the properties of an associated communications channel, and files created within that directory are to be transmitted via the associated communications channel using the defined channel properties. The API 18 or a system administrator may also set control attributes by creating one or more metadata files associated with a destination or associated with a particular file, in the same directory. There may be a plurality of separate directories that are each associated with a respective configuration file and each of which has one or more destination-specific metadata files.

In this embodiment, the monitoring component 16 is provided on the computer 20. The monitoring component 16 can be implemented in hardware or in software, but a monitoring component 16 according to the current embodiment is implemented in software. This software-implemented monitoring component 16 runs as a daemon process to monitor one or more directories (or to monitor complete file systems) and to identify any new files within those directories. This daemon process may be run whenever an associated messaging manager is run. The daemon process is typically configured with information identifying one or more directories that the monitoring component 16 is required to monitor. In one embodiment, the monitoring component 16 is an event-driven observer program or object that is activated by file creation events, file update events and file renaming events. In another embodiment, the monitoring component 16 periodically polls for changes within a monitored file system 12.

Figure 3:
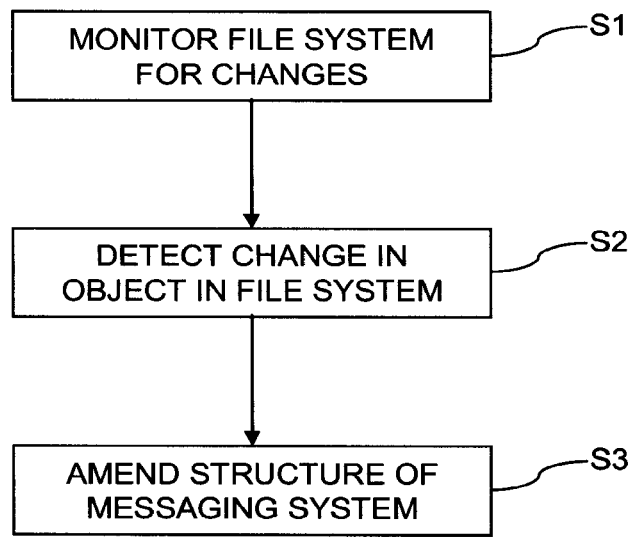
FIG. 3 is a flow chart of a method of operating the data processing system.

As discussed above, the monitoring component 16 identifies new, changed or deleted objects within the file system 12, such as directories, sub-directories and files, and processes these changes accordingly. FIG. 3 summarizes the method of operating the data processing system. The method comprises the steps of, step S1, monitoring the file system 12, step S2, detecting a change in the file system 12, and step S3, amending the structure of the messaging system 14, according to the detected change in the file system 12. This process can be performed continually by the monitoring component 16 as a background task, or can be performed periodically according to a defined scheme. At the same time as the steps S1 to S3 are being performed, the method also further comprises the reverse function of monitoring the messaging system 14, detecting a change in the messaging system 14, and amending the structure of the file system 12, according to the detected change in the messaging system 14. It will be appreciated that the steps defined in FIG. 3 are also being carried out in reverse, simultaneously. Monitoring of changes to the messaging system 14 is carried out and any detected change is populated to the file system 12.

Figure 4A:
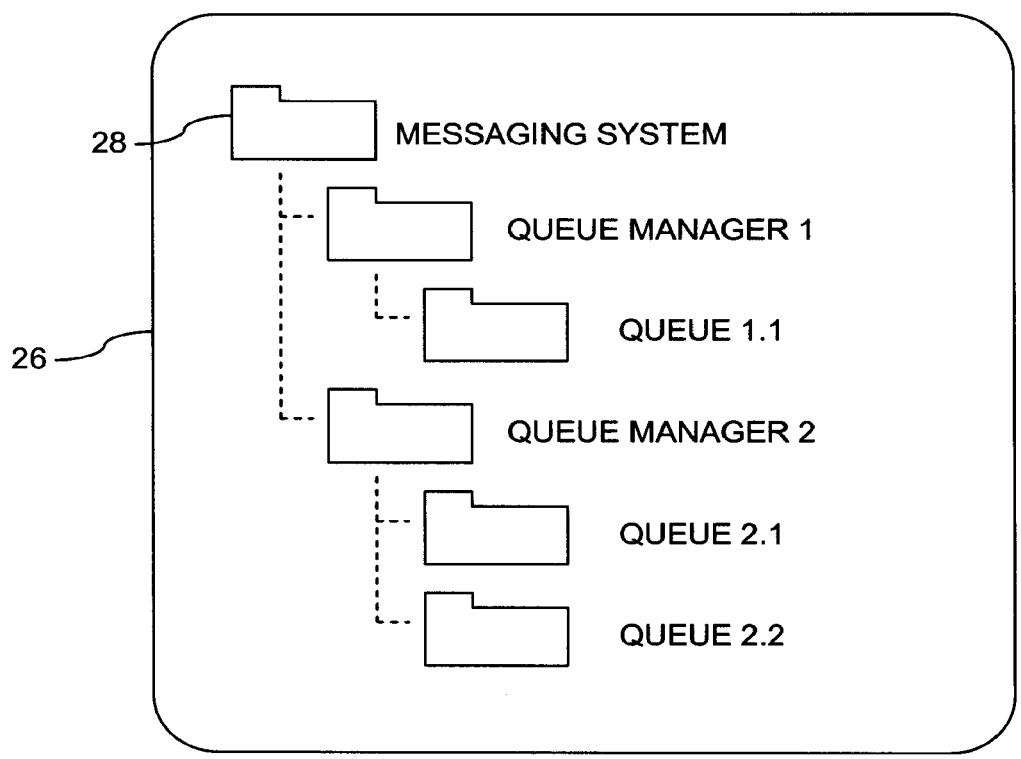
FIGS. 4a, 5a and 6a are schematic diagrams of a graphical user interface showing a file system.

FIG. 4a shows a graphical user interface 26 to the API 18 that gives the user access to the file system 12. This API can be a standalone application for the sole purpose of giving the user administrative access to the messaging system 14, or can be a conventional existing API such as Windows Explorer (Microsoft, Windows, Windows NT, and the Windows logo are trademarks of Microsoft Corporation in the United States, other countries, or both), which can be used as a functioning part of the data processing system, without any amendment. The "work" done within the system to carry out the administrative tasks that the user has made is executed by the monitoring component 16. The monitoring component 16 itself may be single component or may be made up of a number of distributed sub-applications that reside in different physical locations, for example, with one component monitoring directly the file system 12, and a further component actually interfacing with the APIs of the different messaging components of the messaging system 14, in order to carry out the changes.

Figure 4B:
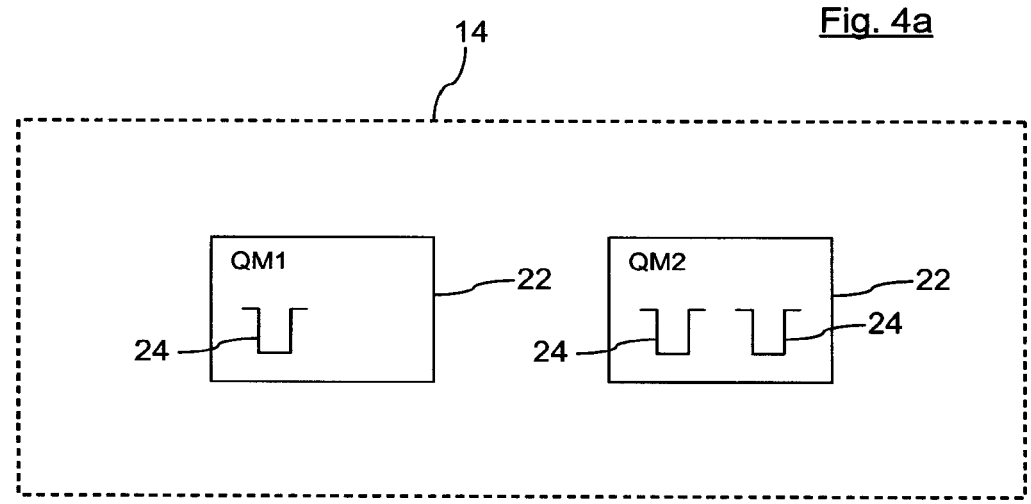

The graphical user interface 26 of FIG. 4a shows a directory 28 called "messaging system" that is used to contain the representation of the messaging system 14. Of course the naming and structure of the file system 12 can be embodied in many different ways. Within the directory 28 are two sub-directories "queue manager 1" and "queue manager 2", which relate to the two queue managers 22 shown in FIG. 4b. The further sub-directories in the graphical representation of the file system 12 relate to the queues 24 shown in FIG. 4b. As can be seen from FIG. 4, in a simple and easy to understand manner, the file system 12 is used to represent the structure of the messaging system 14. The nature of any object within the messaging system 14 is determined by the relative position in the hierarchy of the file system 12 of the corresponding object.

Figure 5A:
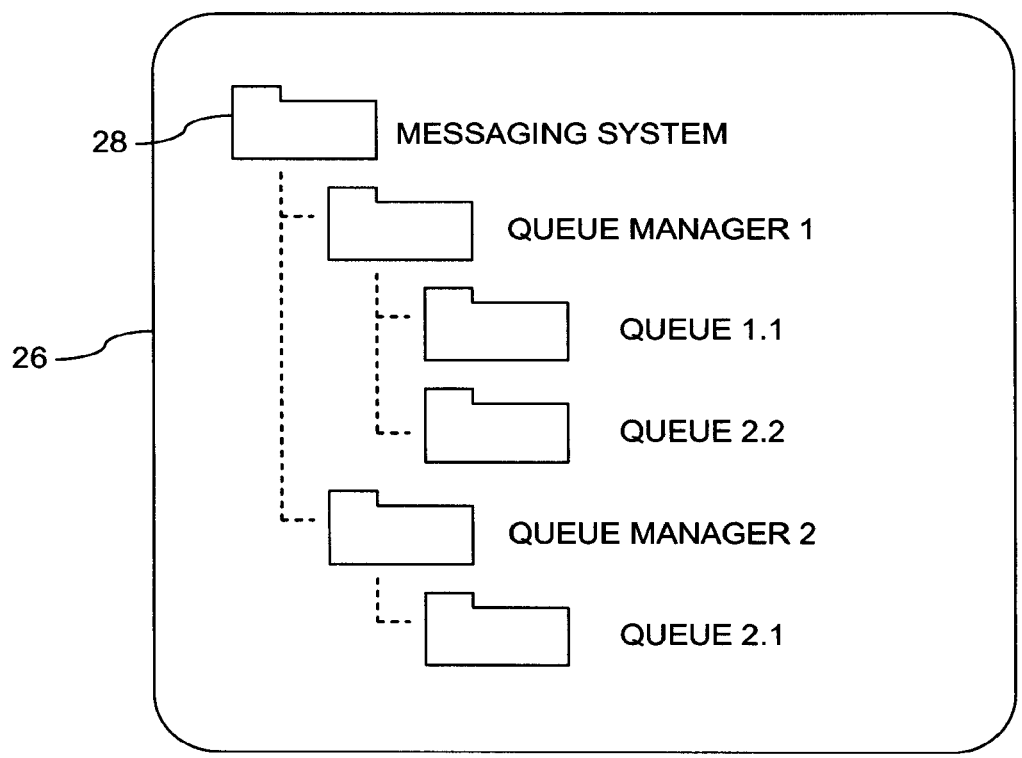
Figure 5B:
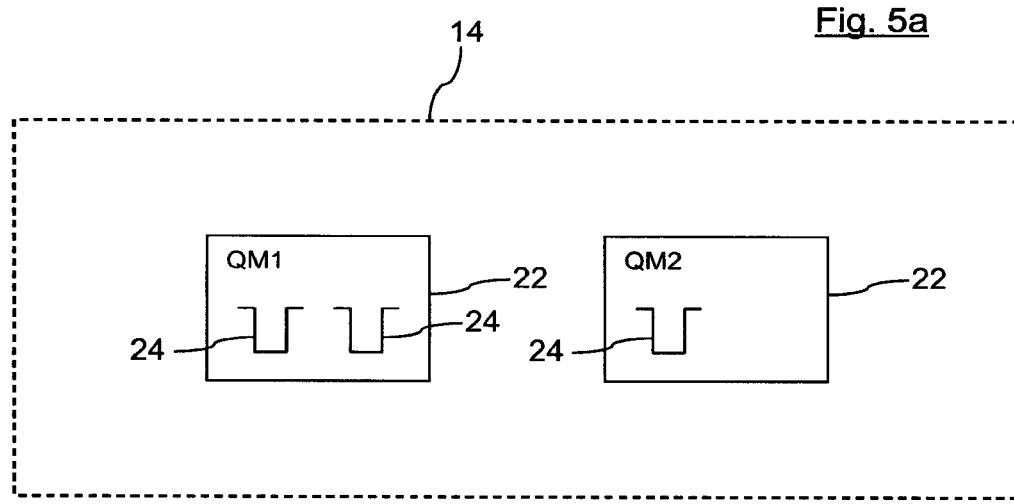

FIGS. 5a and 5b show the file system 12 and the messaging system 14 after the user has made a change. This change is made by the user in the graphical user interface 26 of the API 18 which is then populated by the monitoring component 16 to the messaging system 14. The monitoring component 16 monitors the file system 12, detects any change in the file system 12, and amends the structure of the messaging system 14, according to the detected change in the file system 12. The change that the user had made is to move the sub-directory "queue 2.2" from the "queue manager 2" directory to the "queue manager 1" directory. As a result the topology of the messaging system has been amended in FIG. 5b, to reflect this change. The file system paradigm provides the user with a method of accessing administrative functions of the messaging system 14, without needing to know anything about the APIs that are need to make such a change.

Figure 6A:
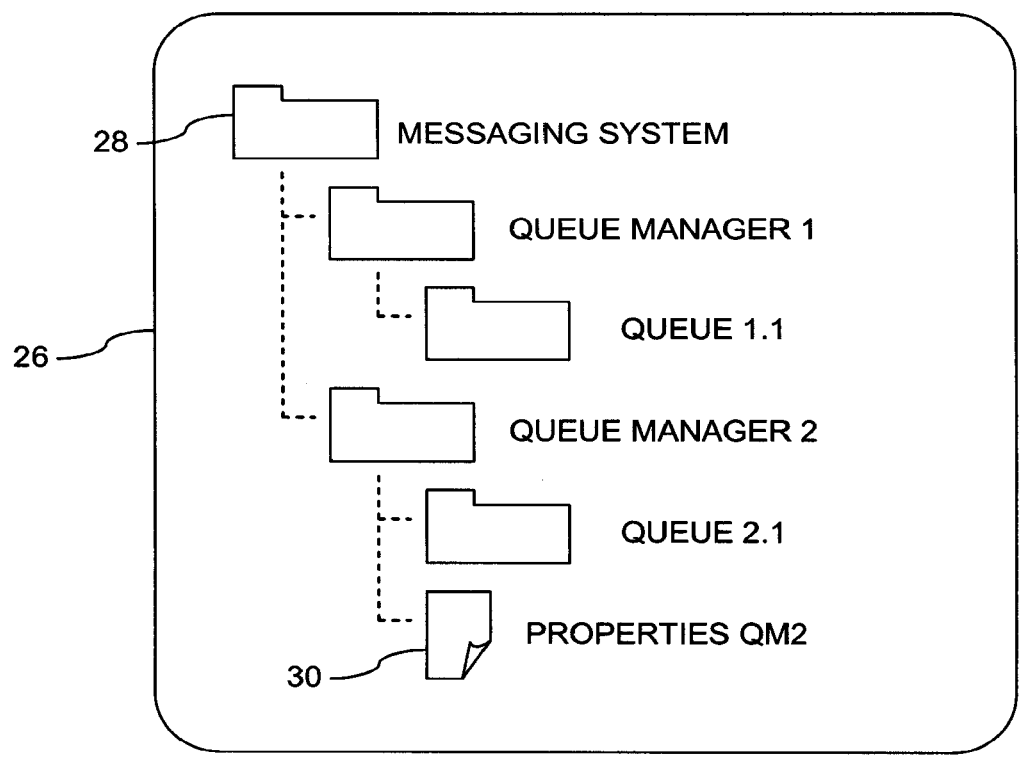
Figure 6B:
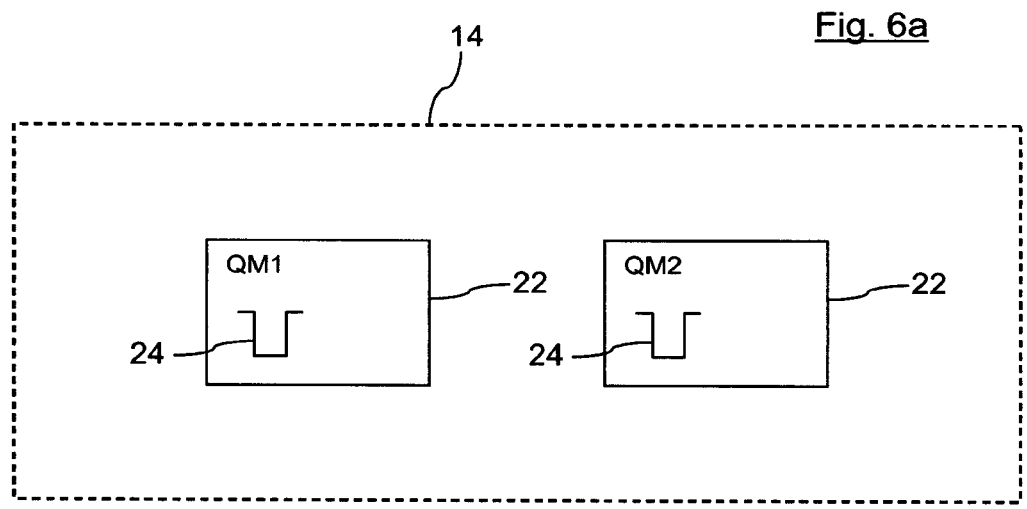

A further example of additional changes that a user might make is shown in FIGS. 6a and 6b. Here, the user has deleted the queue "queue 2.2" and also added a file "properties qm2". The deletion of the specific queue is detected by the monitoring component 16, which makes the changes to the messaging system 14, as can be seen in FIG. 6b. The queue has been deleted from the messaging system 14.

The file 30 that has been created modifies the properties of the queue manager "qm2". The location within the file system 12 and/or the naming of the file 30 determines which component or components within the messaging system 14 are affected by the contents of the file 30. The file 30 can be created in a simple text editor and saved in the desired position within the file system 12 by the user. In one embodiment, a set of default properties exist for each object within the messaging system 14, which are used when an object is created by a file system 12 action. In another embodiment, all properties are specified. The file 30 is then used to amend the properties of one or more of the objects within the messaging system 14. For example, properties of objects in the queue manager may be set using generic names (for example, 'name' for the name of the object, 'maxMessageSize' for the maximum size of a message), some properties may be messaging engine specific (e.g. 'MQ-XXX' for an MQ-specific property).

The file 30 can also be used to define properties of multiple objects. For example, in one embodiment, the file 30 can be in the same location within the file system 12 as shown in FIG. 6a, but be named "properties q". In this case, the monitoring component 16 will use the name of the file 30 as the direction to populate the properties of the file to all the queues 24 that are currently under the control of the "queue manager 2", rather than as relating to the queue manager 22 itself. In fact, multiple files 30 can exist within the same directory 28, with the names of the files indicating the objects to which the individual files 30 refer. In another embodiment, the file 30 can be in placed under the directory "queue 2.1" in the file system 12 as shown in FIG. 6a, following a pre-determined naming convention, in which case, such a file would be queue 2.1 specific.

It will be readily understood that FIGS. 4 to 6 refer to changes made in the file system 12 being detected and replicated in the messaging system 14. In an equal and opposite way, changes in the messaging system 14, such as the creation or deletion of objects such as queues, will be detected by the monitoring component 16, and will result in changes being made to the file system 12. These changes will be apparent to the user when they access the file system 12, for example through the interface 26.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appending claims.

The invention claimed is:

1. A method of operating a data processing system, the data processing system comprising a file system, a messaging system and a monitoring component, the method comprising:
    monitoring the file system,
    detecting a change in the file system, and
    amending by the monitoring component a structure of the messaging system, to replicate the detected change in the file system.

2. The method according to claim 1, further comprising:
    monitoring the messaging system, detecting a change in the messaging system, and amending by the monitoring component a structure of the file system, to replicate the detected change in the messaging system.

3. The method according to claim 1, wherein the detected change in the file system comprises at least one of:

creation, amendment or deletion of a file; and
wherein the amending of the structure of the messaging system comprises at least one of:
a corresponding creation or deletion of one or more objects in the messaging system or an amendment of properties of one or more objects in the messaging system.

4. The method according to claim 1, further comprising:
mapping the detected change in the file system to an action associated with amending the structure;
propagating the action to the messaging system; and
executing the action.

5. The method according to claim 1, wherein the structure is associated with at least one of:
an administrative property or
an administrative object.

6. A data processing system comprising:
a file system,
a messaging system, and
a monitoring component, wherein the monitoring component is configured to perform
monitoring the file system,
detecting a change in the file system, and
amending a structure of the messaging system to replicate the detected change in the file system.

7. The system according to claim 6, wherein the monitoring component is further configured to perform:
monitoring the messaging system,
detecting a change in the messaging system, and
amending a structure of the file system to replicate the detected change in the messaging system.

8. The system according to claims 6, wherein
the detected change in the file system comprises at least one of:
creation,
amendment or
deletion of a file; and
the monitoring component is arranged, when amending the structure of the messaging system, to correspondingly, at least one of:
create or delete one or more objects in the messaging system or
amend properties of one or more objects in the messaging system.

9. The system according to claim 6, further comprising:
a mapping system for mapping the detected change in the file system to an action associated with amending the structure;
a propagating system for propagating the action to the messaging system; and
an executing system for executing the action.

10. The system according to claim 6, wherein the structure is associated with at least one of:
an administrative property or
an administrative object.

11. A computer program product comprising a computer usable storage medium having stored therein computer usable program instructions for operating a monitoring component, the monitoring component forming part of a data processing system also including a file system and a messaging system, the computer usable program instructions, which when executed by the data processing system, cause the data processing system to perform:
monitoring the file system,
detecting a change in the file system, and
amending a structure of the messaging system, in response to the detected change in the file system.

12. The computer program product according to claim 11, wherein the computer usable instructions further cause the data processing system to perform:
monitoring the messaging system,
detecting a change in the messaging system, and
amending a structure of the file system, in response to the detected change in the messaging system.

13. The computer program product according to claim 11, wherein
the detected change in the file system comprises at least one of:
creation,
amendment, or
deletion of a file; and
the instruction for amending the structure of the messaging system comprises an instruction for correspondingly performing at least one of:
creation or deletion of one or more objects in the messaging system or
the amendment of the properties of one or more objects in the messaging system.

14. The computer program product according to claim 11, wherein the computer usable instructions further cause the data processing system to perform:
mapping the detected change in the file system to an action associated with amending the structure;
propagating the action to the messaging system; and
executing the action.

15. The computer program product according to claim 11, wherein
the structure is associated with at least one of:
an administrative property or
an administrative object.

* * * * *